Figure 1:
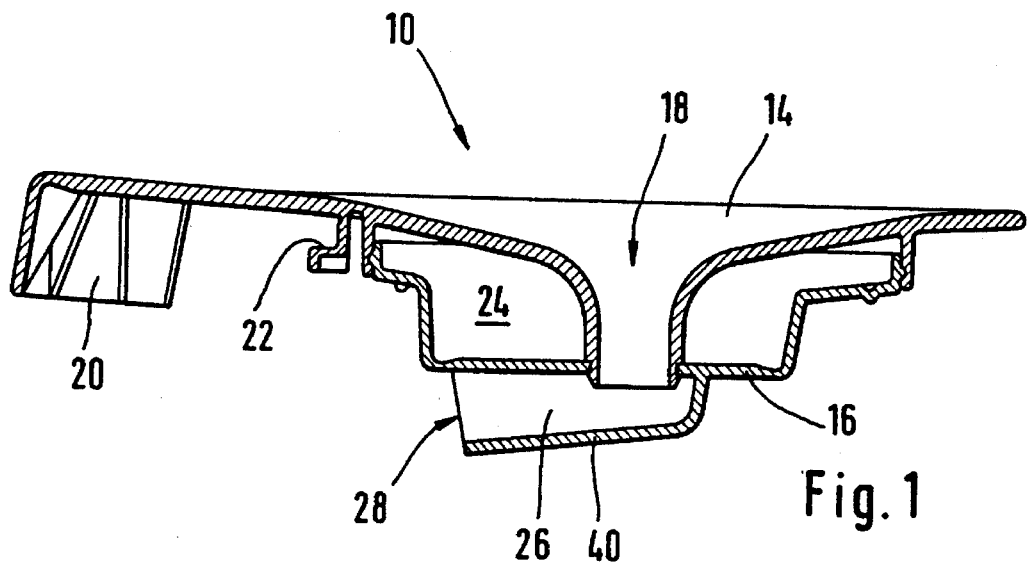

United States Patent [19]

Link et al.

[11] Patent Number: 5,609,194

[45] Date of Patent: Mar. 11, 1997

[54] LID FOR A CARAFE FOR HOLDING A BREWED BEVERAGE

[75] Inventors: Karl Link, Bad Homburg; Günter Oppermann, Dietzenbach; Utz Wagner, Frankfurt am Main, all of Germany

[73] Assignee: Braun Aktiengesellschaft, Kronberg, Germany

[21] Appl. No.: 490,305

[22] Filed: Jun. 14, 1995

[30] Foreign Application Priority Data

Jul. 1, 1994 [DE] Germany .................. 44 23 110.5

[51] Int. Cl.$^6$ ............................ B65B 39/00; B67C 11/04
[52] U.S. Cl. ........................ 141/331; 220/374; 222/460
[58] Field of Search ........................... 141/331–345, 141/286; 220/354–357, 367–369, 373, 374, 731, 734, 719, 377.1, 378, DIG. 27; 222/460, 475.1

[56] References Cited

U.S. PATENT DOCUMENTS 4,638,929  1/1987  Stone, Jr. .......................... 222/456

FOREIGN PATENT DOCUMENTS 0406125   1/1991   European Pat. Off. ......... A47J 31/44
U-9016307 4/1991   Germany .

*Primary Examiner*—Henry J. Recla
*Assistant Examiner*—Timothy L. Maust
*Attorney, Agent, or Firm*—Fish & Richardson, P.C.

[57] ABSTRACT

The invention is directed to a lid (10) having an inlet opening (18) and provided for being fitted onto a carafe (12) for holding a brewed beverage. In order to prevent the escape of steam from the carafe (12) through the inlet opening (18), a steam deflector (40) is provided on the lid (10) beneath the inlet opening (18). Further, in order to avoid the undesired effect of liquid leaking from the inlet opening (18) as the brewed beverage is being poured from the carafe (12), the inlet opening (18) terminates into a laterally extending inlet channel (26) whose channel wall (40) forms the steam deflector.

6 Claims, 1 Drawing Sheet

LID FOR A CARAFE FOR HOLDING A BREWED BEVERAGE

This invention relates to a lid for a carafe for holding a brewed beverage as, for example, a coffee or tea carafe, which includes an inlet opening beneath which a steam deflector is arranged.

Lids of this type are used, for example, with coffee carafes for coffee makers. With its lid fitted, the coffee carafe is placed underneath a coffee filter of the coffee maker, so that coffee discharged from the coffee filter flows through the inlet opening of the lid into the carafe.

From DE-U 90 16 307 a lid for a coffee maker is known in which the inlet opening is closable by a valve if coffee does not flow into the carafe. This has the advantage of preventing the escape of steam from the coffee carafe. For one thing, this avoids heat losses, the coffee cools down more slowly, or less heating power is required for keeping it warm. For another thing, the coffee remaining in the carafe becomes less concentrated and less strong because steam is not allowed to escape, which has a positive effect on its flavor.

It is an object of the present invention to configure the inlet opening of a lid of the type initially referred to such that it largely prevents an escape of steam from a carafe holding a brewed beverage with the lid fitted thereon without the provision of a valve, while on the other hand preventing leakage at the inlet opening as liquid is poured from the carafe holding the brewed beverage.

This object is accomplished by the features of claim 1.

The steam deflector of the lid of the present invention is arranged so as to extend transversely at a relative distance beneath the lid inlet opening, thus enabling liquid to flow from above through the inlet opening onto the steam deflector, and onwards laterally along this deflector, entering the carafe holding the brewed beverage. The steam deflector covers the inlet opening, thus preventing steam from escaping from the carafe directly upwards through the inlet opening of the lid. The steam deflector directs rising steam away from the inlet opening to the side where it rises to the underside of the lid, condensing there and dripping back into the carafe. The amount of steam exiting through the inlet opening past the steam deflector is negligibly small. It is a further advantage of the present invention that no movable parts are required for closing the inlet opening of the lid to prevent the discharge of steam.

By means of the present invention, the escape of steam and oxidation by entry of air are significantly reduced, as a result of which the beverage contained in the carafe preserves its flavor for a long time. In addition, the low loss of steam results in a low loss of heat which is of advantage in particular for thermal carafes.

The steam deflector may be arranged transversely or at an inclination beneath the inlet opening. It may also serve a steam directing function, directing rising steam in one direction to the side or to all sides away from the inlet opening. For this purpose, it may be provided with a downwardly pointing tip or rounded portion from which a circumferential surface curves outwardly in an upward direction.

According to the present invention, an inlet channel extending laterally away from the inlet opening adjoins the inlet opening of the lid. In this arrangement, the lower area of a channel wall provides the steam deflector preventing a direct escape of steam from the inlet opening. Liquid flowing into the inlet opening is deflected by the inlet channel to the side, flowing out of this channel down into the carafe in a laterally offset relation to the inlet opening.

The inlet channel extending away from a carafe pouring means which may be a pouring opening or a pouring spout affords the added advantage of an overflow protection: It prevents liquid from leaking through the inlet opening of the lid if the carafe is tipped for pouring the brewed beverage. Such an inadvertent leakage of liquid through the inlet opening normally results in the liquid flowing past the drinking vessel instead of into the vessel as intended. Also, the inlet channel prevents liquid from spattering from the carafe through the inlet opening when the carafe is moved vigorously during handling, causing liquid to splash against the inside of the lid. In this arrangement, the mouth of the inlet channel in the interior of the carafe is located on that side of the lid that swings upwardly when the carafe is tipped for pouring a brewed beverage. This accordingly eliminates the risk of liquid flowing into the inlet channel during pouring, avoiding the undesired effect of liquid exiting through the inlet opening when a beverage is poured.

Preferably, the inlet channel extends at a slight downward inclination to cause liquid contained therein to flow, by the action of gravity, towards its mouth opening into the interior of the carafe.

In order that the inlet channel provided on the lid extends away from the pouring means of the carafe with the lid fitted onto the carafe, it is necessary for the relative angular position of lid and carafe to be clearly fixed. In simple embodiments, this can be accomplished in that the lid is provided with a cutout for pouring. The lid is placed down onto the carafe such that this cutout is at the pouring spout of the carafe. The lid may also include a laterally projecting handle which is required to register with a manipulating handle of the carafe as the lid is being fitted. It is, however, advantageous to place the lid down onto the carafe in positive engagement therewith, such positive engagement allowing fitting of the lid only if the lid is in the predetermined angular position relative to the carafe. It is thereby ensured that the inlet channel is in its proper position relative to the pouring means of the carafe.

Preferably, the mouth of the inlet channel in the interior of the carafe is in the side area of the lid, that is, at the highest point when the carafe is tipped for pouring the brewed beverage.

The steam deflector or the inlet channel is preferably made integrally with the lid or, where a lid comprised of several parts is involved as, for example, for a thermal carafe, with a lid bottom part. The added manufacturing expenditure necessary for the steam deflector or the inlet channel is maintained low in that the steam deflector or the inlet channel is fabricated together with the lid or the lid bottom part in a single operation.

According to the features of claim 5, leakage of liquid through the inlet opening during pouring is avoided in a particularly effective manner because the mouth is always at the largest possible distance to the liquid level resulting when the carafe is held at an inclination.

An embodiment of the present invention will be described in more detail in the following with reference to the accompanying drawings. In the drawings, FIG. 1 is a cross-sectional view of a lid constructed in accordance with the present invention: and FIG. 2 is a top plan view of a thermal carafe.

Figure 2:
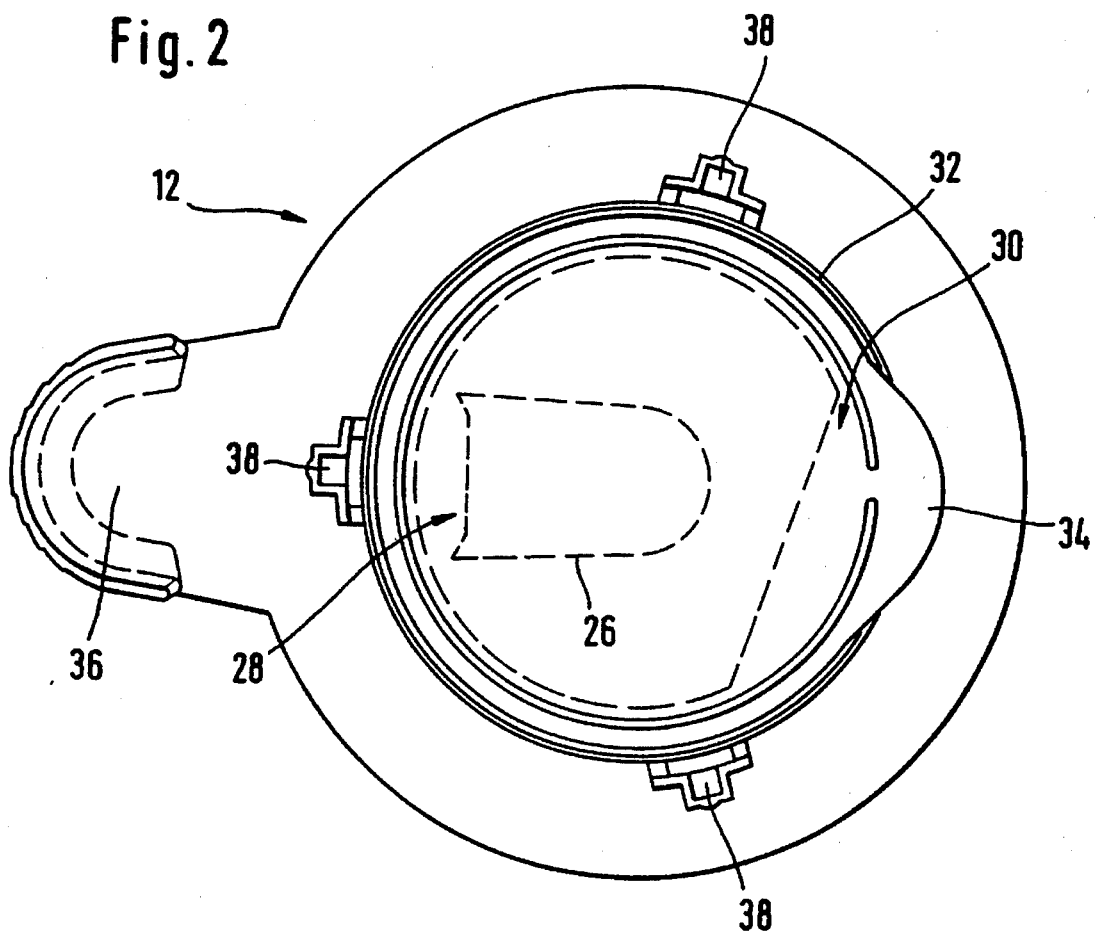

The lid shown in FIG. 1 and generally identified by reference numeral 10 is provided for being fitted onto a thermal carafe 12 as illustrated in FIG. 2. The lid 10 is made of two parts, comprising a top part 14 and a bottom part 16.

The lid top part 14 is of a funnel-shaped configuration, with the funnel form merging into an inlet opening 18 extending through the center of the lid 10. At a location on its periphery, a handle member 20 projects radially from the top part 14. The lid top part 14 has on its underside three locking members 22 of which only one is shown in FIG. 1. These locking members 22 serve to detachably connect the lid 10 with the thermal carafe 12. They are non-uniformly spaced on the periphery of the lid 10.

The lid bottom part 16 is fixedly connected with the lid top part 14, combining, for the purpose of providing a good thermal insulation, with the top part 14 to enclose a hollow space 24 which may be filled with an insulating material. An inlet channel 26 into which the inlet opening 18 terminates is provided on the bottom part 16. The inlet channel 26 extends laterally in the direction of the handle member 20. It terminates in the side area of the lid 10, its mouth 28 being in the interior of the thermal carafe 12 with the lid 10 placed down onto the thermal carafe 12.

The inlet channel 26 has a lower channel wall 40 providing a steam deflector directing the steam rising in the thermal carafe 12 away from the inlet opening 18 and preventing almost completely the escape of steam from the thermal carafe 12 through the inlet opening 18. Further, the lower channel wall 40 prevents liquid from splashing out of the thermal carafe 12 through the inlet opening 18 when the thermal carafe 12 is moved vigorously.

The thermal carafe 12 illustrated in FIG. 2 has at its upper end a filling and pouring opening 30 with a peripheral rim 32 formed at a location on its circumference so as to provide a pouring spout 34.

Opposite the pouring spout 34, the thermal carafe 12 is provided with a manipulating handle 36.

Distributed on the rim 32 of the filling and pouring opening 30 are three recesses 38 suitable for engagement by the locking members 22 of the lid 10. Registering with the locking members 22, these recesses 38 are unevenly distributed on the circumference of the thermal carafe 12. As the lid 10 is seated down onto the thermal carafe 12, the locking members 22 become engaged with the recesses 38. By turning the lid 10 a small angle relative to thermal carafe 12, the locking members 12 engage with undercuts of the recesses 38, which undercuts, being not shown in the drawings, extend in the circumferential direction so that the lid 10 is connected with the thermal carafe 12.

By virtue of the non-uniform arrangement of the locking members 22 and the recesses 38, the angular position of the lid 10 relative to the thermal carafe 12 is predetermined: The handle member 20 of the lid 10 lies above the manipulating handle 36 of the thermal carafe 12. The inlet channel 26 indicated in FIG. 2 together with a circumferential wall of the lid 10 in dashed lines extends from the center of the lid 10 in the direction of the handle member 36 of the thermal carafe 12 and away from the carafe pouring spout 34. The mouth 28 of the inlet channel 26 is thus at a location swinging upwardly when the thermal carafe 12 is tipped in the direction of the pouring spout 34 to pour a beverage. As a result of this arrangement, liquid is prevented from entering the inlet channel 26 and flowing out of the inlet opening 18 even in cases when the full thermal carafe 12 is inclined a relatively large degree.

With the lid 10 seated in place, the thermal carafe 12 is provided for placement beneath the coffee filter of a coffee maker not shown. Coffee discharged through the filter is directed through the funnel-shaped lid top part 14 to the inlet opening 18 where it flows through the inlet channel 26 into the thermal carafe 12.

We claim:

1. A lid for a carafe for holding a brewed beverage and including a pouring means, said lid including an inlet opening, and comprising a steam deflector and an essentially laterally extending inlet channel wherein the inlet opening terminates into the essentially laterally extending inlet channel in the lid, and wherein the inlet channel extends away from the pouring means of the carafe when the lid is assembled onto the carafe.

2. The lid as claimed in claim 1 wherein the inlet channel extends from the inlet opening at a slight downward inclination.

3. The lid as claimed in claim 1 or claim 2, wherein the inlet channel has a mouth disposed in a side area of the lid.

4. The lid as claimed in claim 1 or claim 2, wherein the steam deflector and the inlet channel are made integrally with the lid.

5. The lid as claimed in claim 3, wherein the mouth of the inlet channel faces away from the pouring means when the lid is assembled onto the carafe.

6. The lid as claimed in claim 1 or claim 2, wherein the lid comprises a bottom part made of at least two parts and wherein the steam deflector and the inlet channel are made integrally with the lid bottom part.

* * * * *